United States Patent Office 2,963,441
Patented Dec. 6, 1960

2,963,441

SORBENTS AND PROCESS FOR THEIR PREPARATION

Frank E. Dolian, United States Army, and Saul Hormats, Baltimore, Md., assignors to the United States of America as represented by the Secretary of War No Drawing. Filed Nov. 23, 1944, Ser. No. 564,888

14 Claims. (Cl. 252—190)

(Granted under Title 35, U.S. Code (1952), sec. 266)

The invention described herein may be manufactured and used by or for the Government, for governmental purposes, without the payment to us of any royalty thereon.

This invention relates to an improved type of impregnated charcoal obtained through the addition of pyridine or related compounds to activated charcoal, preferably in the presence of metal compound impregnants, such as oxides of copper, chromium, and the like.

The invention is concerned with increasing protection afforded by charcoal against various physiologically harmful concentration of various war gases including particularly cyanogen chloride.

Another object of this invention is to provide a sorbent of increased stability.

A further object is to provide a stable, high quality impregnated charcoal.

A still further object is to provide improved method for preparing catalyst impregnated carriers.

The attainment of the foregoing and other objects will be understood from the following description.

The term sorbent is intended herein to denote materials which function as adsorbents, absorbents, or both; and the term sorb is intended to denote either or both physical and chemical selective retention of gaseous materials.

On account of the low degree of protection afforded by activated charcoal fillings of gas-mask canisters against cyanogen chloride and the rapidity with which this gas is desorbed from charcoals after exposure, serious attempts have been made to improve the sorbing capacity of the charcoals for this gas. Various alkaline and metal oxide impregnants were investigated for this purpose.

It is now found that a considerable improvement in protection against cyanogen chloride results from impregnation of activated charcoal with pyridine and certain related heterocyclic nitrogen-containing compounds. In addition, charcoals impregnated with pyridine type compounds are found to be considerably more stable than other types of impregnated charcoals with respect to loss of cyanogen chloride protection during storage.

Gamma-picoline and beta-picoline are closely related pyridine base homologues which were also found to be highly effective in improving the performance of activated charcoal against cyanogen chloride. Certain of these, for example, gamma-picoline, are even superior to pyridine in regards to the initial performance and also in regards to the stability during storage. The study of all such available heterocyclic nitrogen-containing organic compounds indicates, in general, that pyridine homologues and analogues which do not have a substituent group on an alpha carbon atom, adjacent to the tertiary nitrogen atom, are effective in producing a charcoal with improved protection against cyanogen chloride when used as impregnants on charcoal.

The addition of the suitable heterocyclic organic compounds to charcoal or a similar carrier may be effected in several ways. Amongst these are: direct addition to an impregnating solution used for applying other impregnants to the charcoal; addition either in aqueous or organic solvent to either unimpregnated or previously impregnated charcoal; addition in the form of vapor; and spraying in the form of a concentrated solution.

The quality of resulting products with regard to protection against cyanogen chloride depends on the particular impregnant and the amount added to the charcoal rather than on the method of impregnation. Accordingly, these impregnants may be used advantageously to correct the deficiency of existing supplies of activated charcoals for protection against cyanogen chloride simply by adding them in the form of vapor or liquid spray to such charcoals at any time.

In the determination of suitable impregnants, consideration must be given to several factors, such as, stability of the impregnants in use and storage, physiological effects of vapors from the impregnant, the manner in which the impregnant can be conveniently applied, optimum amounts of impregnants, and effects of the impregnant on the sorption characteristics of the charcoal or impregnated charcoal, as well, as, the effectiveness of the impregnant in retaining cyanogen chloride.

While there is little difference made in the effectiveness of the pyridine type impregnant by the method of impregnation, the amount of the pyridine type impregnant used should be regulated to conform with the stringency of the method of drying so that a sufficient quantity of this impregnant remains on the charcoal, for if the impregnated charcoal is subjected to a high drying temperature, the organic impregnant tends to be desorbed or removed by vaporization to a greater degree.

The effectiveness of the impregnant increases with the amount of impregnation, but it has been found that more than about 1% by weight of impregnation with pyridine impregnant is desirable for adequate protection against cyanogen chloride. However, the pyridine impregnant can be excessive. With about 2% of pyridine impregnant on the charcoal the protection is adequate and the amount of pyridine desorption is not significant so that there is no substantial amount of odor. With a preferred optimum amount of pyridine impregnant in the range from about 1.5 to about 3.5% there is a low loss of the impregnant and no substantial deleterious effect on the functioning of the charcoal, in sorbing other war gases or contaminants, so that the single sorbent material satisfactorily fulfills all requirements of a chemical filling for gas-mask canisters. Certain of the more effective pyridine type impregnants may be preferably added in somewhat smaller amounts than pyridine. In general, the pyridine type impregnants are significantly useful for accomplishing objects set forth when added in amounts even as low as 0.1% and give increased protection against cyanogen chloride when added in higher proportions, e.g., 6% or higher, but they tend to show a maximum effectiveness at some proportion intermediate 1% and 6%.

The base or carrier used for impregnation to obtain a gas-mask canister filling is preferably activated charcoal from various charred substances, such as wood, nuts, shells, coal, fruit stones, etc. Charcoal is a highly porous substance composed principally of carbonized organic material, and as such, is called primary charcoal. By subjecting primary charcoal to the action of steam or heated gas by processes known as activation, the property of adsorption, which primary charcoal possesses, is greatly increased. The sorption properties of activated charcoal are further increased by impregnation with certain metal compounds notably oxides of copper, chromium, molybdenum, vanadium, and the like.

In the general method of impregnation with a metal oxide, a compound of the metal is dissolved in an aqueous solution, which is absorbed by the charcoal, and the wet impregnated charcoal is heated to a sufficiently elevated temperature to convert the metal compound impregnant into an activated form, the final temperature usually being close to the ignition temperature of the charcoal.

In the impregnation of activated charcoal or other porous carrier materials it is very advantageous to use ammoniacal salts rather than salts which are more difficult to convert into activated metal oxides, as is pointed out in the U. S. Patent 1,956,585 of May 1, 1934 to N. E. Oglesby et al. Furthermore, excess ammonia in the impregnating solution acts as a stabilizing agent in preventing precipitation of the salt before it is properly adsorbed by the charcoal or carrier. Yet, before the adsorbed salt is finally converted to the active metal oxide form, ammonia as well as adsorbed aqueous solvent has to be removed, preferably at a rapid rate and at as low a temperature as possible.

In the treatment of the wet impregnated charcoal, it has been found desirable to obtain a quick drying of the material in thin layers of substantially uniform thickness at sufficiently low temperatures, e.g. below 100° C. to prevent undesirable reactions, such as reduction of active metallic compounds to inactive lower valence compounds, which take place rapidly at temperatures above 100° C. in the presence of water. Final heating temperature after the bulk of the water has been removed depends on the particular kind of metal compound impregnant, for example, chromium compounds require a lower conversion temperature than copper compounds to obtain the active form. The catalytic or adsorption activity of the dried metal oxide impregnant depends mainly on the surface characteristics of the impregnant, and this in turn depends upon the drying conditions.

As an example of a specific procedure for producing an activated charcoal impregnated with metal oxides and also impregnated with a pyridine type compound the following example is given:

A gas activated charcoal of approximately 12 to 16 mesh is treated with an aqueous solution of copper ammonium carbonate complex, then dried and heat treated to produce a copper oxide impregnated charcoal suitable for use in gas-mask canisters. The impregnating solution is made up to contain approximately 8 to 10% copper, 10 to 12% ammonia, 8 to 10% carbon dioxide, and 0.2 to 0.5% silver nitrate. The activated charcoal is wetted by soaking in the impregnating solution, drained to remove excess liquid, dried by contact with a stream of hot drying gas, then finally oven-dried until its temperature reaches about 180° C. The drying and the final heating may be carried out with a hot oxidizing gas or inert gas, such as, air, carbon dioxide, or nitrogen and preferably with such gases free of moisture in the final heat treatment.

In a like manner, activated charcoal or a different carrier may be impregnated with a solution containing other metal compounds which are to become converted into catalytic oxides, as for example, the oxides of chromium, molybdenum, vanadium and the like. For example, chromic acid or ammonium molybdate may be dissolved in the ammoniacal impregnating solution.

Using the described procedure for impregnating, tests were conducted to determine the effects of added pyridine type compounds in the impregnating solution also by reimpregnating. The sorbents were tested in tubes in accordance with established methods.

Conditions of test were as follows:

| | |
|---|---|
| Cyanogen chloride concentration, mg./l. | 2.5 |
| Depth of layer, cm. | 5.0 |
| Flow rate, l./cm.²/min. | 0.5 |
| Relative humidity of air stream, percent | 80 |
| Mesh size of impregnated charcoal | 12–16 |

Effects of additions of various pyridine type compounds on protection against cyanogen chloride, using the foregoing test conditions, are shown in the following typical data:

Table I

| Sorbent | Life of Sorbent Against Cyanogen Chloride. Sorbent equilibrated with water vapor to 80% relative humidity, min. |
|---|---|
| Activated charcoal, no impregnant | 12 |
| Activated charcoal containing 2.6% pyridine | 54 |
| Activated charcoal impregnated with copper oxide (whetlerite) | 10 |
| Above whetlerite plus 2.6% pyridine | 84 |
| Above whetlerite plus 3.8% pyridine | 102 |
| Above whetlerite plus 4.0% 2-amino pyridine | 61 |
| Above whetlerite plus 1.6% gamma picoline | 71 |
| Above whetlerite plus 4.0% gamma picoline | 138 |
| Above whetlerite plus 4.0% N-ethyl morpholine | 87 |

These tests demonstrated that the listed pyridine type compounds were definitely effective in improving the performance of the impregnated charcoal in removal of the toxic contaminant from the air for an adequate life period while the contaminant is present in a likely high concentration and the air flow corresponds to an average inhalation rate. The tests also demonstrated the superiority of gamma-picoline over pyridine.

The effects of pyridine type compounds on the stability of impregnated charcoal with respect to loss of cyanogen chloride protection during moist closed storage at elevated temperatures is shown by the following typical data:

Table II

| Sorbent | Life of Sorbent Against Cyanogen Chloride. Sorbent equilibrated with water vapor to 80% relative humidity, min. |
|---|---|
| Copper-chromium impregnated charcoal, no stabilizer: | |
| Original life | 96 |
| After storage for 3 days, moist, 65° C | 4 |
| After storage for 7 days, moist, 65° C | 4 |
| After storage for 14 days, moist, 65° C | 3 |
| Same absorbent as above, only containing 3.5% pyridine: | |
| Original life | 132 |
| After storage for 3 days, moist, at 65° C | 84 |
| After storage for 7 days, moist, at 65° C | 96 |
| After storage for 14 days, moist, at 65° C | 82 |

The data shows that the use of pyridine considerably lengthens the period during which a canister will give protection, because the test conditions are highly intensified. Moreover, the pyridine impregnation can be readily renewed by simply injecting a small amount of liquid pyridine into a canister at its air inlet.

Pyridine impregnated charcoal can be made in existing charcoal impregnating plants without difficulty and with the advantage that the impregnated charcoal can be dried at a lower temperature since pyridine evidently accelerates the release of ammonia.

An industrial scale unit regularly used for impregnating charcoal with metal compounds has been employed for obtaining a pyridine impregnated product with changes simply in the impregnating solution and drying conditions. The time of impregnation in this unit was about 25 minutes and the retention time in a 40 foot rotary dryer was varied from about 2 to 3 hours depending on the wet impregnated charcoal feed rate. An increase in feed rate reduces the retention time in the dryer and reduces the air-charcoal ratio. By control of these factors, impregnation with pyridine allowed a reduction in dryer temperature from 400° F. to 390° F., and finally to 370° F.

Air was drawn through the dryer at approximately 600 cubic feet per minute. After leaving the dryer, the vapors were passed upwardly through a dust scrubber, then through a condenser to a recovery tower containing copper shavings. A weak solution of ammonia and carbon dioxide was circulated through the recovery tower countercurrent to the gas flow. The concentration of ammonia and carbon dioxide builds up in the solution due to the removal of these compounds from the air and vapors exhausted from the dryer; and at the same time, copper is dissolved into this solution of ammonia and carbon dioxide was circulated through the recovery tower countercurrent to the gas flow. The concentration of ammonia and carbon dioxide builds up in the solution due to the removal of these compounds from the air and vapors exhausted from the dryer; and at the same time, copper is dissolved into this solution to generate new impregnated solution. At the same time any volatilized pyridine may be recovered in this solution.

During the course of impregnation with ammoniacal copper complex solution containing added pyridine, it was noticed that the drainings possessed practically no odor of pyridine. Investigation showed that with 3% of pyridine in the solution and with equal volumes of solu- and charcoal used, in a soaking time of 20 minutes, practically all the pyridine was absorbed.

The effect of pyridine on the permissible dryer temperature on volatilization of ammonia is shown in the following table:

*Table III*

[Type Impregnation: Copper oxide, chromium oxides, and silver from ammoniacal carbonate solutions]

| Type of impregnated Activated Char | Percent Pyridine in Impregnating Solution | Dryer Temp. ° F. | Volatile $NH_3$ mg./l. air/100 ml. char. (averages) |
|---|---|---|---|
| Wood | 0.0 | 400 | 0.0034 |
| Do | 0.0 | 390 | 0.0038 |
| Do | 1.6 | 390 | 0.0022 |
| Do | 3.0 | 390 | 0.0016 |
| Coal | 0.0 | 370 | 0.0065 |
| Do | 3.0 | 370 | 0.0028 |

It was noted that at a given temperature the volatile ammonia content of the impregnated char dropped significantly each time the amount of pyridine in the impregnating solution was increased. This permitted beneficially a lower drying temperature, since the usual practice is to dry at as low a temperature as possible while still making the drying product pass the volatile ammonia specification. Another advantage of a lower drying temperature is the larger margin of safety to prevent fires in the dryer by ignition of the charcoal.

As already indicated, not all pyridine derivatives have the same effectiveness as pyridine. The compounds found to be most satisfactory are characterized by heterocyclic compounds which contain a single nitrogen atom in the ring and without a substituent group in the alpha position. For example, lutidines, alpha-picoline, and quinoline exhibit relatively very low effectiveness. On the other hand, some of the compounds in the group with somewhat lower effectiveness than pyridine showed they may be used more advantageously than pyridine itself in having still lower volatility and in being less odorous. Beta-picoline and gamma-picoline meet these requirements and have better effectiveness on a weight-efficiency basis than pyridine; also, they show as good stability as pyridine in storage tests.

It is to be noted that certain commercial distillation fractions readily available as such have been tested. These fractions are mixtures of compounds practicable for coal tar refiners to furnish. One of these fractions known as the "beta-gamma picoline cut" is a still cut boiling in the range of 143–145° C. This fraction represents a material containing a high percentage of gamma and beta picolines but includes minor amounts of alpha-picoline and lutidine, also. Test results indicate that this fraction can be satisfactorily used although it does not give quite as high protection as gamma-picoline per se. Obviously the reason for this is the presence of the alpha-picoline and lutidine.

While, it is known that hexamethylene tetramine has been considered as a promising impregnant for protection against cyanogen chloride, by investigation it has been found that this compound is impracticable, because of its decomposition with evolution of ammonia in noticeable amounts during storage.

N-ethyl morpholine, a heterocyclic compound containing one nitrogen atom in the ring and closely related analogue of pyridine, is indicated as being a satisfactory impregnant with apparent advantages over pyridine in being less volatile and less odorous. Other N substituted morpholines which are available and have suitable chemical stability are indicated to be likewise useful.

The pyridine types stabilizing agents may be used effectively with various other adsorptive carriers and with various metallic impregnants, although, they have been shown to be particularly useful with conventional impregnated chars employed in gas-mask canisters for purifying air inhaled through the canisters.

We claim:

1. A method of rendering porous activated charcoal adapted to provide better and longer protection against cyanogen chloride which consists in using said charcoal as a carrier and impregnating said carrier with pyridine in an amount which weighs not less than 1/10 of 1% nor more than 6% as much as the charcoal.

2. A method of rendering porous activated copper compound containing charcoal adapted to provide longer and better protection against cyanogen chloride which consists in using said charcoal as a carrier and impregnating said carrier with N-ethyl morpholine in an amount which weighs not less than 1/10 of 1% nor more than 6% as much as the charcoal.

3. A method of rendering porous activated copper compound containing charcoal adapted to provide longer and better protection against cyanogen chloride which consists in using said charcoal as a carrier and impregnating said carrier with beta picoline in an amount which weighs not less than 1/10 of 1% nor more than 6% as much as the charcoal.

4. A method of rendering porous activated copper compound and chromium compound containing charcoal adapted to provide longer and better protection against cyanogen chloride which consists in using said charcoal as a carrier and impregnating said carrier with beta picoline in an amount which weighs not less than 1/10 of 1% nor more than 6% as much as the charcoal.

5. A method of rendering porous activated copper compound and chromium compound containing charcoal adapted to provide longer and better protection against cyanogen chloride which consists in using said charcoal as a carrier and impregnating said carrier with gamma picoline in an amount which weighs not less than 1/10 of 1% nor more than 6% as much as the charcoal.

6. A method of rendering porous activated copper compound and chromium compound containing charcoal adapted to provide longer and better protection against cyanogen chloride which consists in using said charcoal as a carrier and impregnating said carrier with pyridine in an amount which weighs not less than 1/10 of 1% nor more than 6% as much as the charcoal.

7. A gas canister absorbent consisting of copper compound impregnated activated charcoal containing not less than 1/10 of 1% nor more than 6%, by weight of pyridine.

8. A gas canister absorbent consisting of copper compound impregnated activated charcoal containing not less than 1/10 of 1% nor more than 6% by weight of beta picoline.

9. A gas canister absorbent consisting of copper oxide impregnated activated charcoal containing, by weight about 4% N-ethyl morpholine.

10. A method of rendering porous activated charcoal adapted to provide longer and better protection against cyanogen chloride which consists in using said charcoal as a carrier and impregnating said carrier with at least one compound selected from the group consisting of pyridine, N-ethyl morpholine, beta picoline and gamma picoline in an amount which weighs not less than 1/10 of 1% nor more than 6% as much as the charcoal.

11. A method of rendering porous activated copper compound and chromium compound containing charcoal adapted to provide longer and better protection against cyanogen chloride which consists in using said charcoal as a carrier and impregnating said carrier with at least one compound selected from the group consisting of pyridine, N-ethyl morpholine, beta picoline and gamma picoline in an amount which weighs not less than 1/10 of 1% nor more than 6% as much as the charcoal.

12. A gas canister absorbent consisting of copper compound impregnated activated charcoal containing by weight not less than 1/10 of 1% nor more than 6% of a compound selected from the group consisting of pyridine, N-ethyl morpholine, beta picoline and gamma picoline.

13. A gas canister absorbent consisting of copper oxide impregnated activated charcoal containing, by weight, not less than 1/10 of 1% nor more than 6% beta picoline.

14. A method of rendering porous activated copper oxide containing charcoal adapted to provide longer and better protection against cyanogen chloride, which consists in using said charcoal as a carrier and impregnating said carrier with not less than 1/10 of 1% nor more than 6% of gamma picoline.

References Cited in the file of this patent

UNITED STATES PATENTS

| | | |
|---|---|---|
| 1,519,470 | Wilson | Dec. 16, 1924 |
| 1,520,437 | Pipkin | Dec. 23, 1924 |
| 1,792,939 | Stampe | Feb. 17, 1931 |
| 1,956,585 | Oglesby et al. | May 1, 1934 |
| 2,029,959 | Urbain | Feb. 4, 1936 |
| 2,523,875 | Morrell et al. | Sept. 26, 1950 |

OTHER REFERENCES

Chemical Abstracts, vol. 33, page 8927, 1939.
Chemical Abstracts, vol. 37, page 1637, 1943.